(No Model.)
A. H. KENNEDY.
WATER METER.
No. 587,125. Patented July 27, 1897.
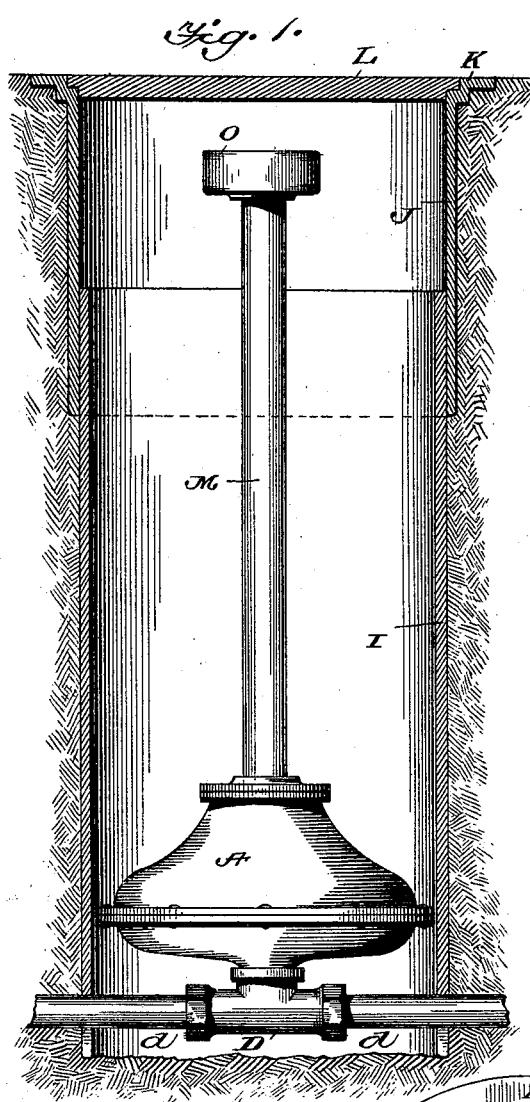
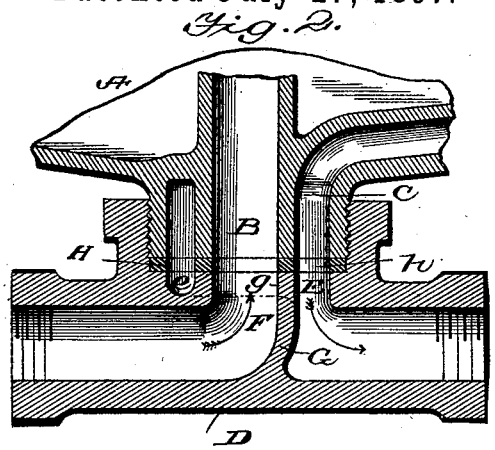
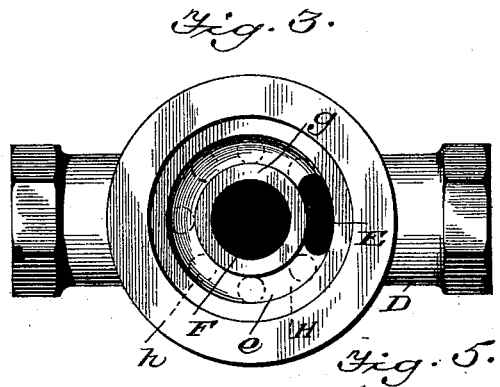
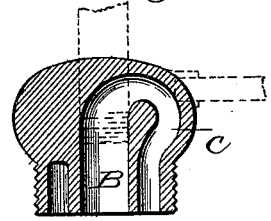
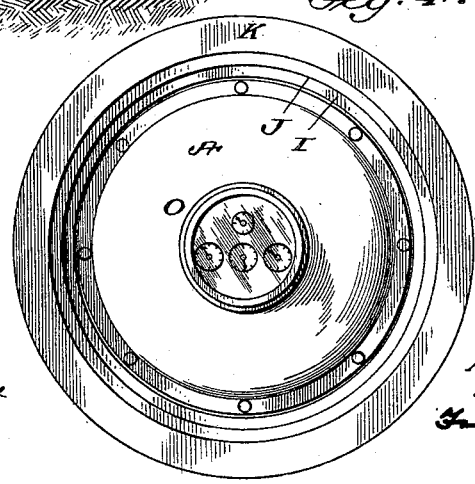
Witnesses
J. H. Dominie
E. S. Poole
Inventor
Albert H. Kennedy.
by Frankland Jannus,
Attorney
THE NORRIS PETERS CO., PHOTO-LITHO., WASHINGTON, D. C.

UNITED STATES PATENT OFFICE.

ALBERT H. KENNEDY, OF ROCKPORT, INDIANA.

WATER-METER.

SPECIFICATION forming part of Letters Patent No. 587,125, dated July 27, 1897.

Application filed June 29, 1896. Serial No. 597,289. (No model.)

*To all whom it may concern:*

Be it known that I, ALBERT H. KENNEDY, a citizen of the United States, residing at Rockport, in the county of Spencer and State of Indiana, have invented certain new and useful Improvements in Water-Meters, of which the following is a description, reference being had to the accompanying drawings, and to the letters of reference marked thereon.

My invention relates to improvements in connection with water-meters, and more especially to the means for connecting them with the pipe the passage of water through which is to be measured. With the ordinary method of attaching the meter, where the same is placed outside of the house or building to be supplied with water, a large box or vault is necessary, if for no other reason than to afford sufficient room for the plumber to handle his tools in making the necessary connections. This he must have in order to place the apparatus in position.

According to my invention no space is required for the workmen in placing the meter for the reason that I provide a special coupling and also modify the construction of the lower portion of the meter, that it (the meter) is simply screwed into position in the coupling provided therefor.

My plan is to bring both inlets together at the bottom of the meter, arranging them concentrically, and to similarly construct a corresponding fitting which is included in the service-pipe, which fitting may be connected in the service-pipe when the latter is laid.

My invention also enables me to bring the meter-dial up to a position where it can be conveniently read.

Other details of improvement will appear, and be referred to in the appended claims.

In the accompanying drawings, Figure 1 is a sectional elevation of the box containing the meter and service-pipe, the meter and service-pipe being shown in elevation. Fig. 2 is an enlarged detail in sectional elevation, showing the special fitting for the service-pipe and the lower portion of a meter embodying the invention. Fig. 3 is a plan view of the meter-connection portion of the service-pipe with the meter removed. Fig. 4 is a top plan view of the apparatus as shown in Fig. 1 with the covering removed. Fig. 5 is a sectional elevation showing a plug adapted to close the opening occupied by the meter when the same is removed.

A represents the meter, which, so far as its measuring mechanism is concerned, may be of any construction which can be arranged to receive and discharge the liquid to be measured through two concentric openings in the lower portion thereof.

As indicated in Figs. 2 and 3, the lower portion of the meter is formed into concentric openings B and C, through which the water to be measured passes inwardly and outwardly, as indicated by the arrows, or vice versa.

D is a special fitting in the nature of a piece of pipe adapted to be connected in the service-pipe. This fitting D is provided at one side with concentric openings E F. Part of the opening E is in the form of a cavity $e$, the said openings being separated by a partition G across the bore of said fitting, which said partition is extended to form a circle $g$, Figs. 2 and 3.

The fitting D is extended in the form of a collar or flange beyond the concentric circles of the inlet and outlet, above which point it is internally screw-threaded or provided with other suitable means of connection. The downwardly-projecting portion of the lower part of the meter within which the inlet and outlet openings become circular and concentric is exteriorly screw-threaded to engage the fitting, into which, as here shown, it is simply screwed fast, although it will be apparent to those skilled in the art that other means of securing the meter to the fitting may be employed, and I desire to point out that any means which accomplish the object of this invention would be included in the claims therefor.

The washer H, of leather, rubber, or other suitable, pliable, and non-corrosive material, is inserted between the meter and the fitting to insure a tight joint. The washer H is formed with a central aperture corresponding with the tubes F B and is provided with a number of openings $h$ to permit the flow of water through the larger openings surrounding the tube B F. These openings $h$ are indicated as circular, but they may be in the form of slits or otherwise, so that portions of the material of the washer connect the outer portion of the same with the inner, thereby holding them together and keeping them in place.

I is the meter-box, which is sunk in the ground at least as far down as the service-pipe $d\ d$, which latter should be below the frost-line. The box I, by reason of my invention, need not be any larger than absolutely necessary to allow of the insertion of the meter—that is, when the fitting D is centrally located with respect thereto, as it should be. The meter is simply lowered into position and screwed into place. The box I may be of any desirable material or even of masonry; but when it is in the form of a box it is convenient to make it extensible—that is, with the upper portion J, which is adjusted so that its upper edge is flush with the pavement. The top of the part J is formed with the rabbeted flange K, into which is fitted a removable cover L.

M is a tubular extension from the top of the meter, through which the parts actuating the recording mechanism are extended.

O is a suitable box upon the upper part of the tube M, in which the recording mechanism is located and which is provided with the usual dial and indicating-hands, as indicated in Fig. 4, so that the same may be conveniently read when the cover L is lifted.

It will also be obvious that by means of a special fitting, including the conformation indicated in Fig. 2 or the equivalent thereof, that many existing meters may be so equipped that the points of connection will be made concentric and brought centrally below them, so that they can be applied to a fitting, such as I have described, by simply lowering them into position and then screwing the connections together.

Fig. 5 shows a plug or cap having like cavities with the lower portion of the meter and which is designed to be screwed into the fitting when the service-pipe is laid, to be removed when the meter is placed, and which, in the event of the meter being removed for repair, may be screwed into the fitting in place of the meter, so as to permit the flow of water. This plug may also be used as a coupling in many different relations by connecting pipes therewith, as indicated in dotted lines.

While I have described my invention as applied to water-meters, in connection with which it is of great utility, it will be obvious that the same may be applied to various purposes other than that mentioned and will be found very convenient where a loop connection is desired with a supply-pipe, said connection being readily made by connecting the ends of the loop to the plug, as indicated in dotted lines in Fig. 5.

Various minor modifications may be made in view of the foregoing without in any way departing from the nature and spirit of the invention.

Having described my invention, what I claim is—

1. The combination with a service-pipe, of a fitting permanently connected therein and having concentric openings adapted for inflow and outflow therethrough under pressure, and a meter or other translating device adapted to be directly connected with both openings in said fitting and formed with corresponding inflow and outflow openings.

2. The combination with a supply-pipe, of a fitting provided with a partition extending across the bore thereof and outward to form a tube, a tube concentric thereto, one of said tubes being screw-threaded, and connections between said second tube and the pipe at the other side of the partition, and a translating device formed with like cavities and correspondingly screw-threaded and adapted to fit thereto, whereby the contents of the supply-pipe will be diverted into the translating device through one opening and returned again to the supply-pipe through the other opening and beyond the said partition.

3. A fitting formed with concentric flow-openings provided with suitable screw-threads, and also having inflow and outflow connections adapted for permanent connection with the service-pipe, said inflow connection extending through one of the concentric openings and the outflow through the other, both being adapted to convey liquid under pressure, and a screw-threaded cap adapted to fit said concentric openings and provided with concentric passages connecting the inflow and outflow of the concentric openings in the fitting through said cap.

4. The combination with a circular casing adapted to be placed in the ground, of a service-pipe passing centrally across the lower part thereof and provided with a fitting having upwardly-extending concentric inflow and outflow openings adapted to convey liquid under pressure, one of said openings being suitably screw-threaded, and said openings arranged centrally at the lower portion of the box, and a translating device provided at its lower, central portion with concentric inlet and outlet connections corresponding with those of the fitting, and suitably screw-threaded for connection therewith by rotation.

5. A fitting adapted to be connected in a service-pipe and provided with a partition extending across the bore thereof and outward to form a tube connecting with the supply end of said fitting, and an opening concentric thereto and extending to the delivery end of said fitting, said openings constituting inflow and outflow openings and adapted to convey liquid under pressure, and to deliver the same to, and receive the same back from a suitable translating device connected with said concentric openings.

In testimony whereof I hereto affix my signature in presence of two witnesses.

ALBERT H. KENNEDY.

Witnesses:
E. E. WESSELER,
J. D. TAYLOR.